(12) United States Patent
Chang

(10) Patent No.: US 9,959,909 B1
(45) Date of Patent: May 1, 2018

(54) HDD TRAY AND HDD RACK ASSEMBLY

(71) Applicant: GIGA-BYTE TECHNOLOGY CO., LTD., New Taipei (TW)

(72) Inventor: Yu-Chuan Chang, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 0 days. days.

(21) Appl. No.: 15/472,300

(22) Filed: Mar. 29, 2017

(30) Foreign Application Priority Data

Jan. 9, 2017 (TW) .............................. 106100585 A

(51) Int. Cl.
| | |
|---|---|
| *G06F 1/16* | (2006.01) |
| *H05K 5/00* | (2006.01) |
| *H05K 7/00* | (2006.01) |
| *G11B 33/12* | (2006.01) |
| *G11B 33/02* | (2006.01) |
| *G06F 1/18* | (2006.01) |

(52) U.S. Cl.
CPC ............ *G11B 33/124* (2013.01); *G06F 1/187* (2013.01); *G11B 33/027* (2013.01)

(58) Field of Classification Search
CPC ................................. G06F 1/183; G06F 1/187
USPC ........................................ 361/679.33–679.39
See application file for complete search history.

(56) References Cited

U.S. PATENT DOCUMENTS

| | | | | |
|---|---|---|---|---|
| 7,344,394 B1* | 3/2008 | Barina | ..................... | G06F 1/183 |
| | | | | 361/755 |
| 8,023,259 B2* | 9/2011 | Lam | ..................... | G06F 1/1616 |
| | | | | 292/253 |
| 8,807,488 B2* | 8/2014 | Lee | ..................... | G06F 1/187 |
| | | | | 248/222.51 |
| 9,230,606 B2* | 1/2016 | Ding | ..................... | G11B 33/022 |
| 9,401,181 B2* | 7/2016 | Her | ..................... | H05K 7/1401 |
| 2004/0074082 A1* | 4/2004 | Kim | ..................... | G06F 1/184 |
| | | | | 29/603.03 |

(Continued)

FOREIGN PATENT DOCUMENTS

| | | |
|---|---|---|
| CN | 202332280 | 7/2012 |
| CN | 103970210 | 8/2014 |

(Continued)

OTHER PUBLICATIONS

"Office Action of Taiwan Counterpart Application," dated Jun. 5, 2017, p. 1-p. 3.

*Primary Examiner* — Anthony Haughton
(74) *Attorney, Agent, or Firm* — JCIPRNET

(57) ABSTRACT

A hard disk drive (HDD) tray adapted to carry a HDD includes a base and a cover pivoted to the base. The base includes a bottom plate and two base lateral plates connected to the bottom plate. The cover includes a top plate and two cover lateral plates connected to the top plate. One of each of the cover lateral plates and the corresponding base lateral plate includes a first fixing member which is retractable, and the other includes a fixing hole corresponding to the first fixing member. The HDD is located between the base and the cover. When the cover covers the base, the first fixing members extend into the corresponding fixing holes to fix the relative location of the cover and the base. When the cover is pivoted upward relative to the base, each first fixing member is drawn back along an inner wall of the fixing hole to exit the corresponding fixing hole. A HDD rack assembly is also provided.

8 Claims, 12 Drawing Sheets

(56) References Cited

U.S. PATENT DOCUMENTS

| | | | | |
|---|---|---|---|---|
| 2004/0173544 | A1* | 9/2004 | Chen | G11B 33/128 211/26 |
| 2007/0119793 | A1* | 5/2007 | Peng | A47F 5/0846 211/26 |
| 2012/0243167 | A1* | 9/2012 | Chen | G06F 1/187 361/679.31 |

FOREIGN PATENT DOCUMENTS

| | | |
|---|---|---|
| CN | 204242047 | 4/2015 |
| CN | 104679167 | 6/2015 |
| TW | M378607 | 4/2010 |
| TW | 201112926 | 4/2011 |
| TW | I357594 | 2/2012 |

* cited by examiner

HDD TRAY AND HDD RACK ASSEMBLY

CROSS-REFERENCE TO RELATED APPLICATION

This application claims the priority benefit of Taiwan application serial no. 106100585, filed on Jan. 9, 2017. The entirety of the above-mentioned patent application is hereby incorporated by reference herein and made a part of this specification.

FIELD OF THE INVENTION

The invention relates to a tray and a rack assembly. More particularly, the invention relates to a hard disk drive (HDD) tray and a HDD rack assembly.

DESCRIPTION OF RELATED ART

Generally, if a hard disk drive (HDD) is to be installed in a server, the HDD is usually locked onto a HDD tray, and then a plurality of the HDD trays are fixed to a HDD rack and are installed in the server all together. Nevertheless, since the number of HDDs disposed in the server is significant, troublesome locking and detaching procedures are required when the HDDs are assembled, replaced, or repaired.

A new type of server, also called as an open compute project (OCP) server, has now been developed. The OCP requires the HDD to have a hot-swapping function; however, if screws on the HDD have to be removed before the HDD is detached, it is considerably inconvenient to perform the hot-swapping function.

SUMMARY OF THE INVENTION

The invention provides a hard disk drive (HDD) tray. A HDD may be fixed to the HDD tray in no need of using screws, and thereby the efficiency of assembling and detaching the HDD may be effectively improved.

The invention further provides a HDD rack assembly, and a HDD tray may be fixed to the HDD rack not through locking.

A HDD tray provided by an embodiment of the invention is adapted to carry a HDD and includes a base and a cover. The base includes a bottom plate and two base lateral plates connected to the bottom plate. The cover is pivoted to the base and includes a top plate and two cover lateral plates connected to the top plate. One of each of the cover lateral plates and a corresponding base lateral plate of the base lateral plates includes a retractable first fixing member which is retractable, and the other one includes a fixing hole corresponding to the first fixing member. The HDD is adapted to be located between the base and the cover. When the cover covers the base, the first fixing members extend into the corresponding fixing holes to fix a relative location of the cover and the base. When the cover is pivoted upward relative to the base, each of the first fixing members is drawn back along an inner wall of the fixing hole, so as to exit the corresponding fixing hole.

In an embodiment of the invention, each of the first fixing members includes an outer shell with a concave hole, an elastic member located in the concave hole, and a bead connected to the elastic member. A portion of the bead normally protrudes from the concave hole and is adapted to be retracted into the concave hole when compressed.

In an embodiment of the invention, the two base lateral plates respectively include a plurality of breaches, the breaches surround and define a plurality of cantilevers, and the cantilevers respectively include a plurality of second fixing members protruding from two inner surfaces of the two base lateral plates. The HDD includes a plurality of threaded holes located on two sides, and when the HDD is located in the HDD tray, the second fixing members are adapted to extend into the threaded holes of the HDD.

In an embodiment of the invention, the bottom plate of the base includes a third fixing member. The HDD includes a threaded hole located at a bottom surface, and when the HDD is located in the HDD tray, the third fixing member is adapted to extend into the threaded hole of the HDD.

A HDD rack assembly provided in the embodiment of the invention is adapted to carry a HDD and includes a HDD rack and a HDD tray. The HDD rack includes a rack body, a plurality of fixing structures, and a connector. The fixing structures are disposed on the rack body to form a track, and at least one of the fixing structures includes a first stopper. The connector is disposed on the rack body and located at an end of the track. The HDD tray is detachably disposed on the fixing structures along the track and includes a base and a cover. The base includes a bottom plate and two base lateral plates connected to the bottom plate. The cover is pivoted to the base and includes a top plate and two cover lateral plates connected to the top plate. At least one of the cover lateral plates includes a first arcuate edge corresponding to the first stopper. One of each of the cover lateral plates and a corresponding base lateral plate of the base lateral plates includes a first fixing member which is retractable, and the other one includes a fixing hole corresponding to the first fixing member. The HDD is adapted to be located between the base and the cover. When the HDD tray is located on the track of the HDD rack, and the cover covers the base, the first arcuate edge of the at least one of the cover lateral plates is located next to the first stopper of the at least one of the fixing structures. The first fixing members extend into the corresponding fixing holes to fix a relative location of the cover and the base. When the HDD is located on the track of the HDD rack and the cover is pivoted upward relative to the base, the first arcuate edge of the at least one of the cover lateral plates pushes against the first stopper of the at least one of the fixing structures when the cover rotates, such that the base is moved away from the connector, and each of the first fixing members is drawn back along an inner wall of the fixing hole, so as to exit the corresponding fixing hole.

In an embodiment of the invention, the at least one of the fixing structures includes a second stopper, and at least one of the cover lateral plates includes a second arcuate edge corresponding to the second stopper. When the cover covers the base, the second arcuate edge of the at least one of the cover lateral plates pushes against the second stopper of the at least one of the fixing structures when the cover rotates, such that the base is moved toward the connector.

In an embodiment of the invention, each of the first fixing members includes an outer shell with a concave hole, an elastic member located in the concave hole, and a bead connected to the elastic member. A portion of the bead normally protrudes from the concave hole and is adapted to be retracted into the concave hole when compressed.

In an embodiment of the invention, the two base lateral plates respectively include a plurality of breaches, the breaches surround and define a plurality of cantilevers, and the cantilevers respectively include a plurality of second fixing members protruding from two inner surfaces of the two base lateral plates. The HDD includes a plurality of threaded holes located on two sides, and when the HDD is located in the HDD tray, the second fixing members are adapted to extend into the threaded holes of the HDD.

In an embodiment of the invention, the bottom plate of the base includes a third fixing member. The HDD includes a threaded hole located at a bottom surface, and when the HDD is located in the HDD tray, the third fixing member is adapted to extend into the threaded hole of the HDD.

In an embodiment of the invention, the at least one of the base lateral plates includes a fourth fixing member protruding from an outer surface. At least one of the fixing structures includes a limiting portion corresponding to the fourth fixing member to restrict a location of the HDD tray relative to the HDD rack.

In view of the foregoing, in the HDD tray of the HDD rack assembly provided in the embodiments of the invention, the cover is pivoted to the base. When the cover covers the base, the first fixing members of the cover lateral plates or the base lateral plates extend into the fixing holes of the corresponding base lateral plates or the cover lateral plates to fix the relative location of the cover and the base, such that the HDD is enclosed in the HDD tray. When the cover is pivoted upward relative to the base, each of the first fixing members is drawn back along the inner wall of the fixing hole, so as to easily exit the corresponding fixing hole. In addition, in the HDD rack of the HDD rack assembly, the fixing structure is disposed in the rack body to form the track where the HDD tray is slidably disposed. When the HDD tray is located on the track of the HDD rack, and the cover is pivoted downward relative to the base, the second arcuate edge of the at least one of the cover lateral plates pushes against the second stopper of the at least one of the fixing structures when the cover rotates, such that the base is moved toward the connector, and that the HDD in the HDD tray is connected to the connector. When the HDD tray is located on the track of the HDD rack, and the base is pivoted upward relative to the base, the first arcuate edge of the at least one of the cover lateral plates pushes against the first stopper of the at least one of the fixing structures when the cover rotates, such that the base is moved away from the connector, and that the HDD located in the HDD tray is detached directly from the connector on the HDD rack.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

A hard disk drive (HDD) tray 100 provided in the embodiment is adapted for a HDD 10 (shown in FIG. 3 and FIG. 4A) to be disposed thereon and fixed thereto, and the HDD tray 100 is, together with other HDD trays 100, installed on a HDD rack 30 (shown in FIG. 5) in a server (not shown). In the embodiment, the HDD tray 100 is exemplified as a HDD tray for a 3.5-inch HDD; nevertheless, the HDD tray 100 may also be a HDD tray for a 2.5-inch HDD in other embodiments. A size of the HDD tray 100 may be adjusted according to a size of the HDD 10 to be fixed thereto. According to the embodiment, the HDD 10 may be fixed to the HDD tray 100 in no need of using screws, which is convenient and fast for a user. Detailed descriptions are provided as follows.

Figure 1:
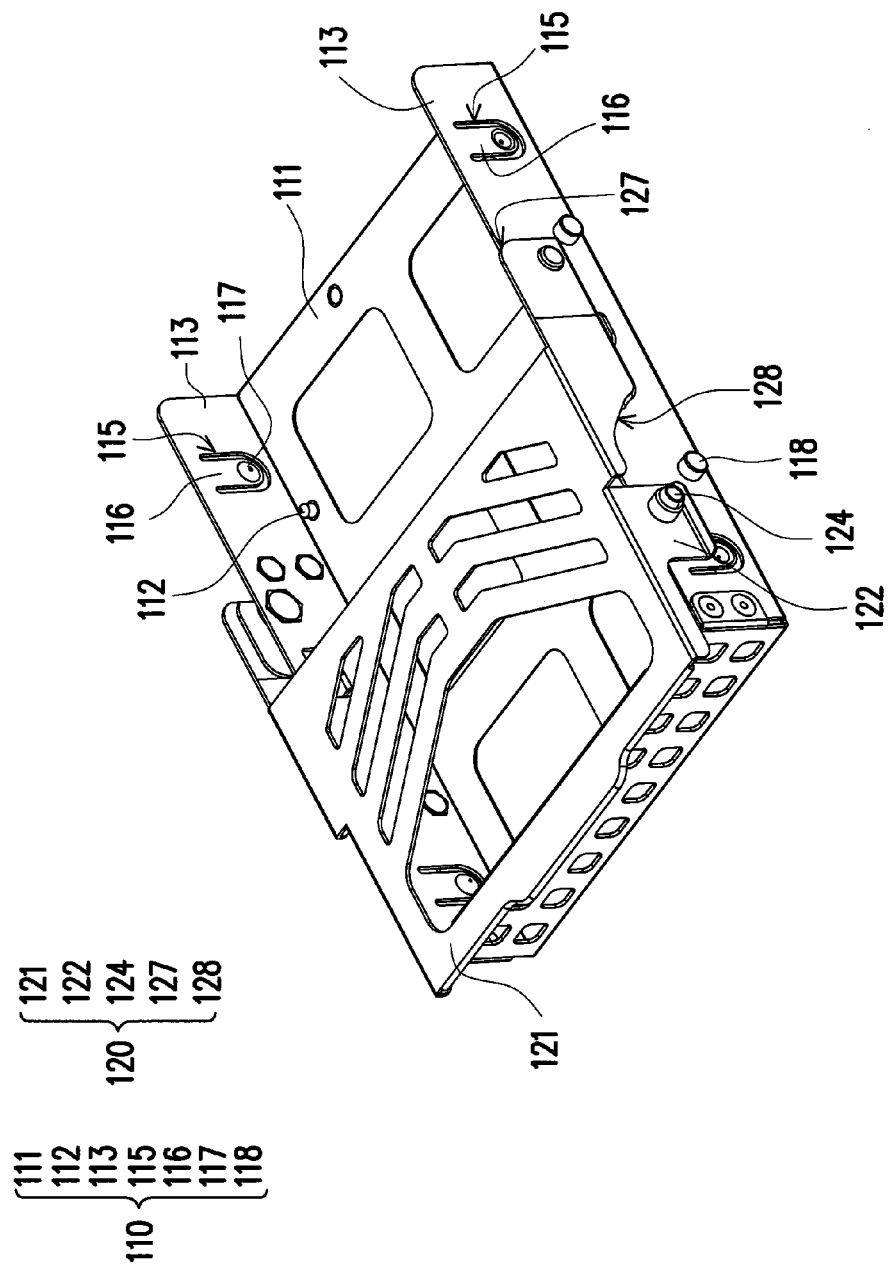
FIG. 1 is a schematic view illustrating a cover of a HDD tray covering a base according to an embodiment of the invention.
Figure 2:
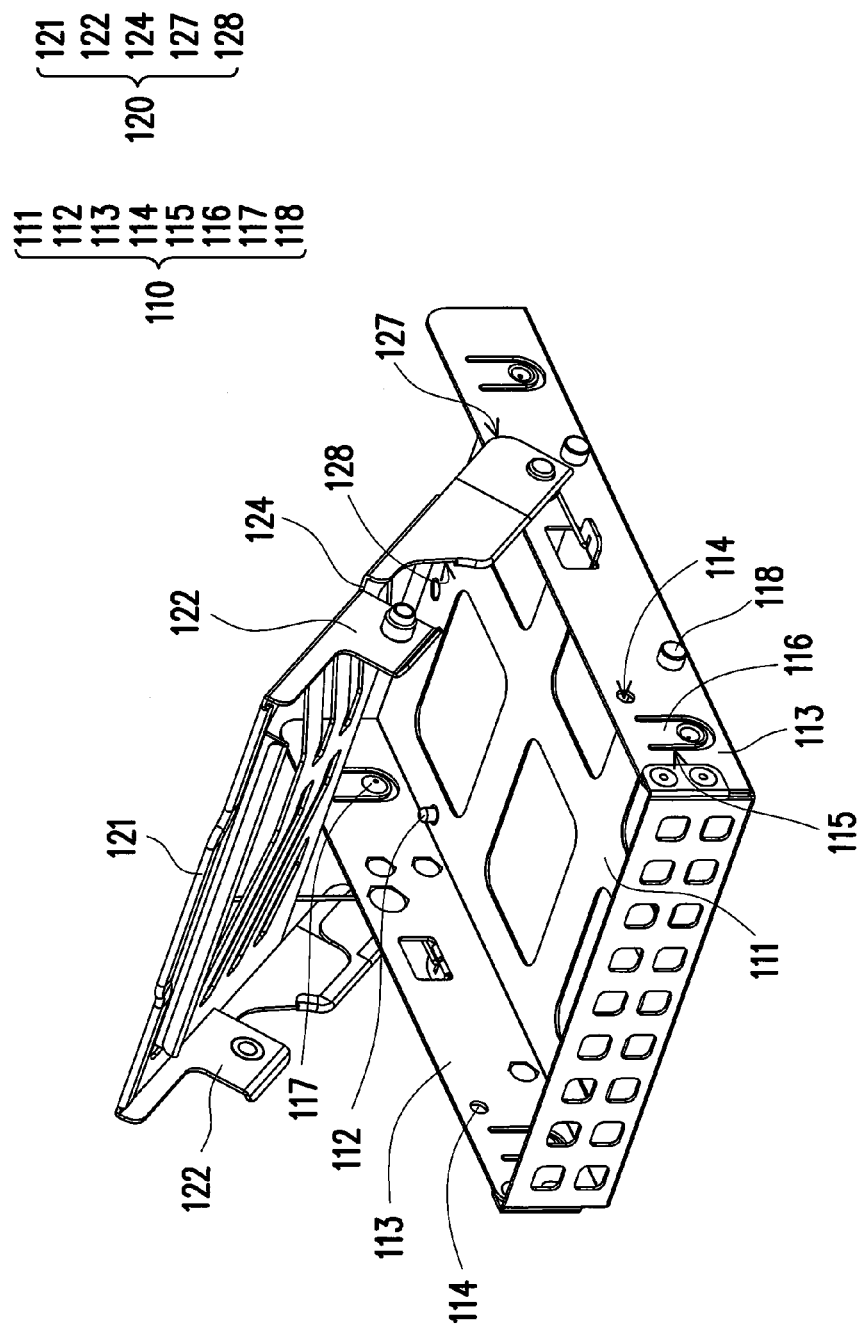
FIG. 2 is a schematic view illustrating that the cover of the HDD tray in FIG. 1 is pivoted upward.
Figure 3:
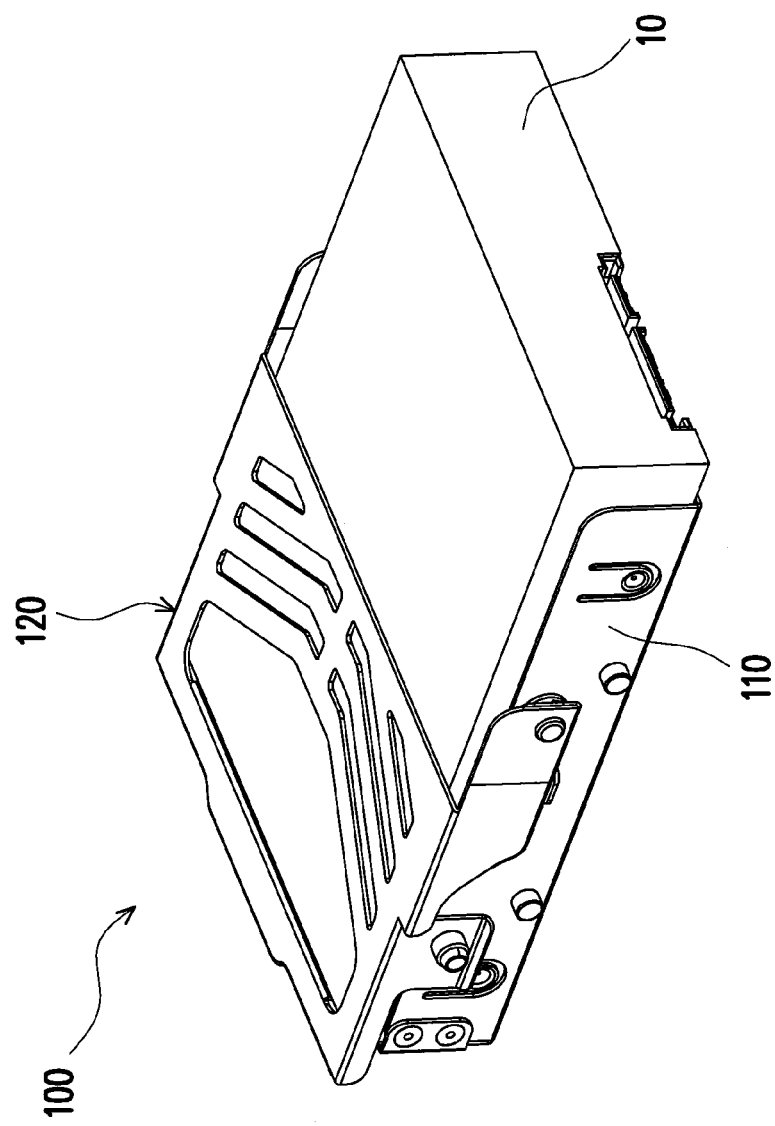
FIG. 3 is a schematic view illustrating a HDD installed into the HDD tray in FIG. 1.
Figure 4A:
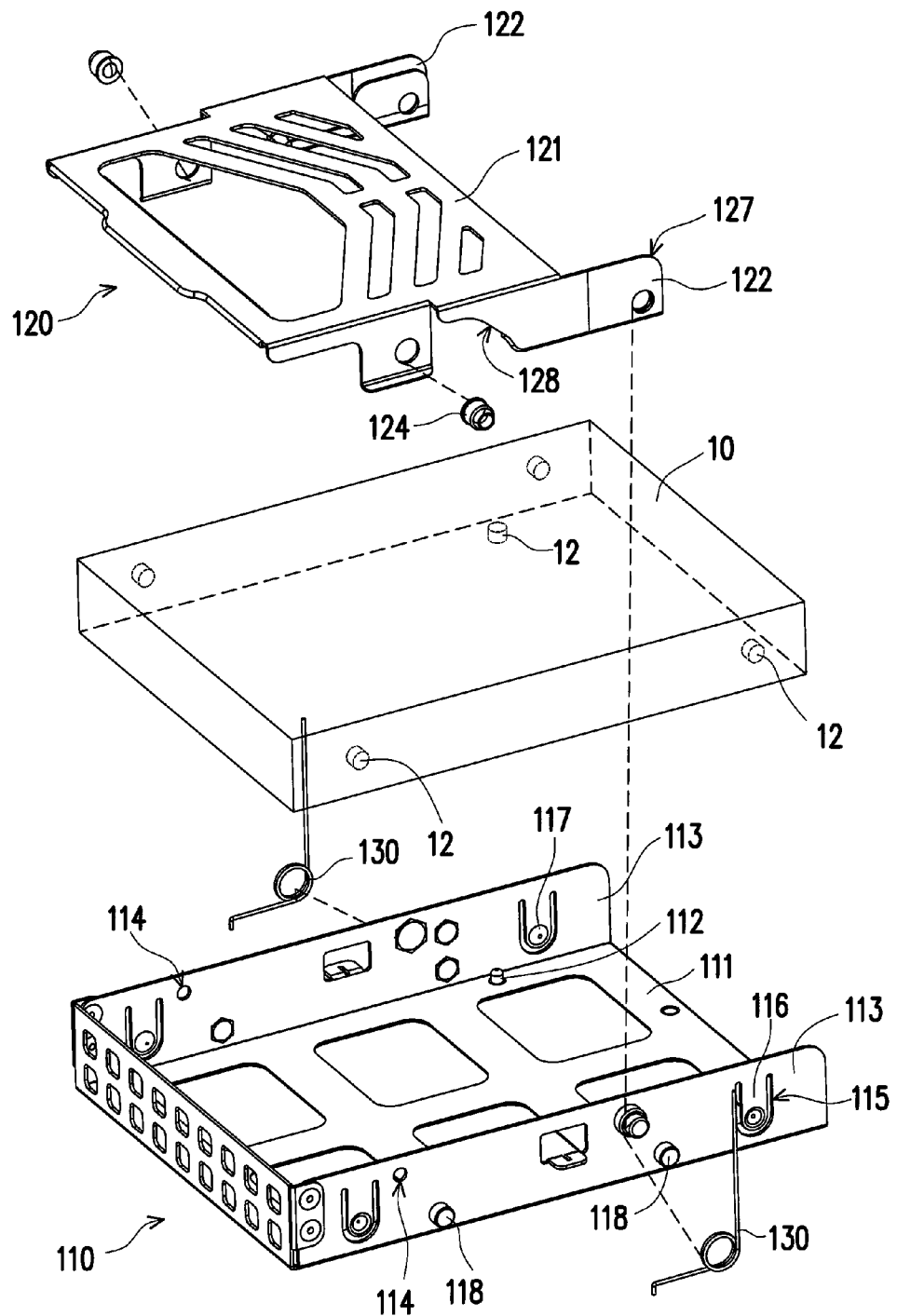
FIG. 4A is a schematic exploded view illustrating a HDD and the HDD tray in FIG. 1.

FIG. 1 is a schematic view illustrating a cover of a HDD tray covering a base according to an embodiment of the invention. FIG. 2 is a schematic view illustrating that the cover of the HDD tray in FIG. 1 is pivoted upward. FIG. 3 is a schematic view illustrating a HDD installed into the HDD tray in FIG. 1. FIG. 4A is a schematic exploded view illustrating a HDD and the HDD tray in FIG. 1.

Referring to FIG. 1 to FIG. 4A, the HDD tray 100 provided in the embodiment is adapted to carry the HDD 10 (shown in FIG. 3 and FIG. 4A). The HDD tray 100 includes a base 110, a cover 120, and at least one elastic member 130. The base 110 includes a bottom plate 111 and two base lateral plates 113 connected to the bottom plate 111. The cover 120 is pivoted to the base 110, and the elastic member 130 (e.g., a torsional spring shown in FIG. 4A) is disposed at a position where the base 110 and the cover 120 are pivoted to each other.

The cover 120 includes a top plate 121 and two cover lateral plates 122 connected to the top plate 121. One of each of the cover lateral plates 122 and a corresponding base lateral plate 113 of the base lateral plates 113 includes a first fixing member 124 which is retractable, and the other one includes a fixing hole 114 corresponding to the first fixing member 124.

As shown in FIG. 4A, in the embodiment, each of the cover lateral plates 122 includes a hole and the first fixing member 124 fixed to the hole. The holes on the cover lateral plates 122 may be through holes; nevertheless, in other embodiments, the holes on the cover lateral plates 122 may be formed by concaving the cover lateral plates 122. The invention is not limited to the illustrations of the drawings. The first fixing members 124 are inserted into the holes on the cover lateral plates 122 and protrude from outer surfaces of the cover lateral plates 122. The fixing holes 114 are disposed on the base lateral plates 113 at a position corresponding to the first fixing members 124, such that the first fixing members 124 may extend into the fixing holes 114.

Figure 4B:
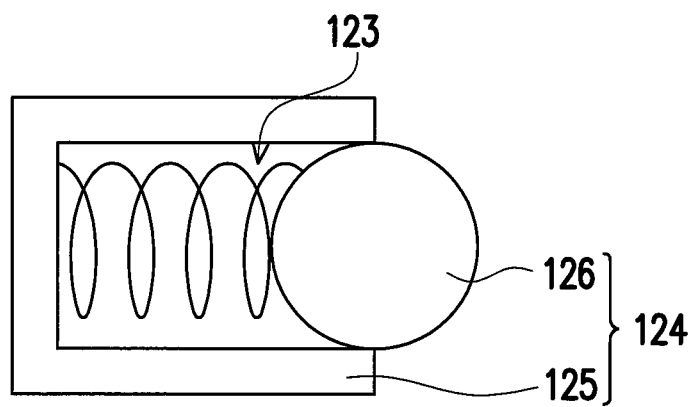
FIG. 4B is a schematic cross-sectional view illustrating the first fixing member in FIG. 4A.

FIG. 4B is a schematic cross-sectional view of the first fixing member in FIG. 4A. Referring to FIG. 4B, each of the first fixing members 124 includes an outer shell with a concave hole 123, an elastic member 125 located in the concave hole 123, and a bead 126 connected to the elastic member 125. The elastic member 125 is, for example, a spring. A portion of the bead 126 normally protrudes from the concave hole 123 and is adapted to be retracted into the concave hole 123 when compressed.

As shown in FIG. 3, the HDD 10 is adapted to be placed between the base 110 and the cover 120. When the cover 120 covers the base 110, if the cover 120 is pressed downward, the first fixing members 124 of the cover 120 extend into the fixing holes 114 of the base 110 to fix a relative position of the cover 120 and the base 110, such that the HDD 10 is enclosed in the HDD tray 100. An elastic potential energy is accumulated by the elastic member 130. If a user intends to pivot the cover 120 upward, the user only has to lift up the cover 120 gently. At this time, each of the first fixing members 124 is drawn back along an inner wall of the corresponding fixing hole 114 and retracted from the corresponding fixing hole 114, and the accumulated elastic potential energy is released by the elastic member 130, such that the cover 120 is pivoted upward relative to the base 110. Certainly, in other embodiments, the elastic member 130 may be omitted; instead, the cover 120 may be pivoted upward manually.

In addition, as shown in FIG. 4A, the HDD 10 includes a plurality of threaded holes 12 located on two side surfaces and a bottom surface. The two base lateral plates 113 of the HDD tray 100 respectively include a plurality of breaches 115. The breaches 115 surround and define a plurality of cantilevers 116, and the cantilevers 116 respectively include a plurality of second fixing members 117 protruding from two inner surfaces of the two base lateral plates 113. In the embodiment, the bottom plate 111 of the base 110 includes a third fixing member 112. The second fixing members 117 may be structures protruding from the cantilevers 116 or may be bosses riveted, welded, or threaded onto the bottom plate 111. The third fixing structure 122 may be a boss riveted, welded, or threaded onto the bottom plate 111. Nevertheless, the types of the second fixing members 117 and the third fixing member 112 are not limited thereto.

When the HDD 10 is located in the HDD tray 100, the second fixing members 117 and the third fixing member 112 extend into the threaded holes 12 at the two side surfaces and the bottom surface of the HDD 10, so as to secure the HDD 10 more firmly. In the HDD tray 100 provided in the embodiment, the threaded holes 12 are designed to be formed at specification positions on the HDD 10, the second fixing members 117 and the third fixing member 112 are disposed corresponding to the positions of the threaded holes 12, and therefore, the HDD 10 is fixed without using any screw and may be installed or detached by the user more conveniently.

Figure 5:
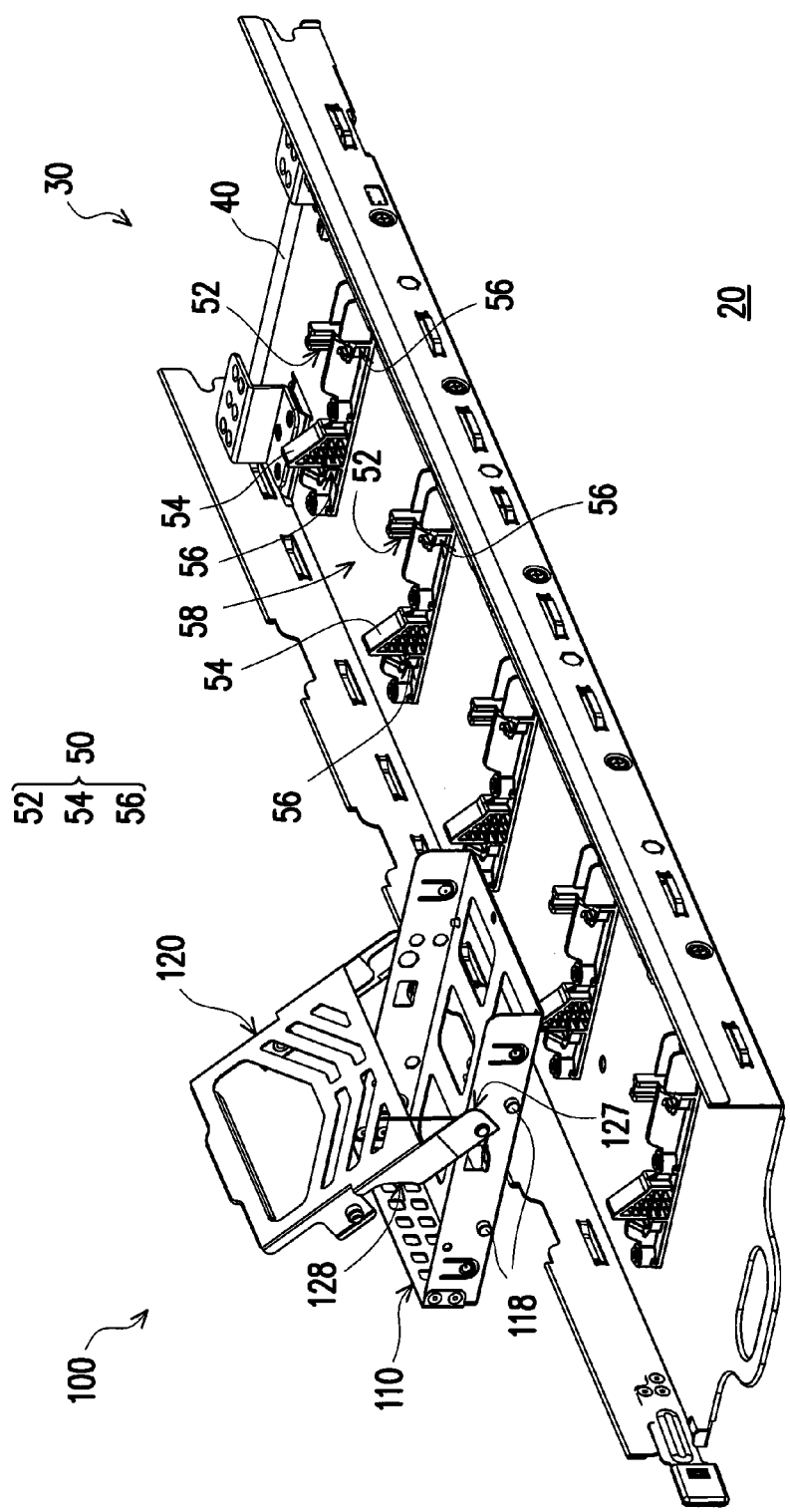
FIG. 5 is a schematic view illustrating a HDD rack assembly according to an embodiment of the invention.
Figure 6:
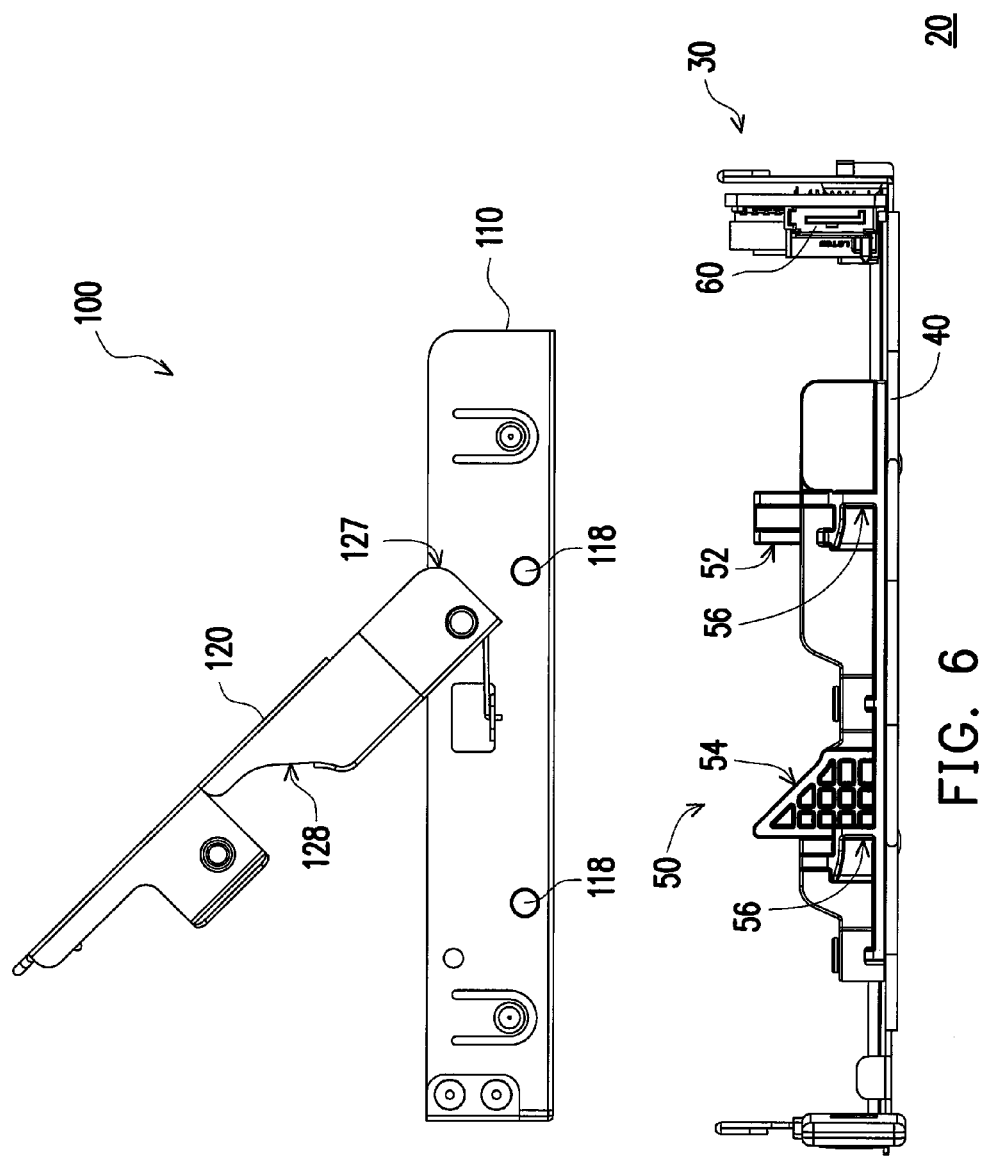
FIG. 6 is a schematic side view illustrating a portion of the HDD rack assembly in FIG. 5.

FIG. 5 is a schematic view illustrating a HDD rack assembly according to an embodiment of the invention. FIG. 6 is a schematic side view illustrating a portion of the HDD rack assembly in FIG. 5. Referring to FIG. 5 and FIG. 6, a HDD rack assembly 20 includes a HDD rack 30 and a HDD tray 100. In the embodiment, the HDD tray 100 of the HDD rack assembly 20 is exemplified as the HDD tray 100 in FIG. 1. Therefore, same reference numbers in the foregoing embodiments are applied as follows. Certainly, in other embodiments, other types of HDD trays may also be adopted in the HDD rack assembly 20.

The HDD rack 30 includes a rack body 40, a plurality of fixing structures 50, and a connector 60. The fixing structures 50 are disposed on the rack body 40 to form at least one track 58. The HDD tray 100 is detachably disposed on the fixing structures 50 along the track 58. The connector 60 is disposed on the rack body 40 and located at an end of the track 58.

More specifically, in the embodiment, the HDD rack 30 includes five sets of fixing structures 50 and four connectors 60. The five sets of fixing structures 50 are arranged side by side on the rack body 40, and the track 58 is formed between two adjacent fixing structures 50. Four tracks 58 are thereby formed by the five sets of fixing structures 50 and may be used to guide four HDD trays 100. The four connectors 60 are disposed at the ends of the four tracks 58 for connecting the HDDs 10 in the HDD trays 100. Certainly, the number of the fixing structures 50 is not limited thereto. The number and positions of the fixing structures 50 may be adjusted by a designer according to sizes of the HDD trays 100, such that the number of the HDD trays 100 to be fixed may be adjusted.

At least one of the fixing structures 50 includes a first stopper 52, a second stopper 54, and at least one limiting portion 56. At least one of the cover lateral plates 122 of each of the HDD trays 100 includes a first arcuate edge 127 corresponding to the first stopper 52 and a second arcuate edge 128 corresponding to the second stopper 54. At least one of the base lateral plates of each of the HDD trays 100 includes at least one fourth fixing member 118 protruding from an outer surface and corresponding to the at least one limiting portion 56. The fourth fixing member 118 may be stopped by the limiting portion 56 to restrict a location of the HDD tray 100 relative to the HDD rack.

More specifically, in the embodiment, each of the fixing structures 50 includes the first stopper 52, the second stopper 54, and four limiting portions 56. Two of the four limiting portions 56 are located on one side of the fixing structure 50, and the other two limiting portions 56 are located on the other side of the fixing structure 50. Each of the cover lateral plates 122 of each HDD tray 100 includes the first arcuate edge 127 and the second arcuate edge 128. Each of the base lateral plates 113 of each HDD tray 100 includes two fourth fixing members 118. In the embodiment, the fourth fixing members are bosses, and the limiting portions 56 include a horizontal wall parallel to the rack body 40 and a vertical wall perpendicular to the rack body 40. Certainly, the types of the fourth fixing members 118 and the limiting portions 56 are not limited thereto.

Figure 7:
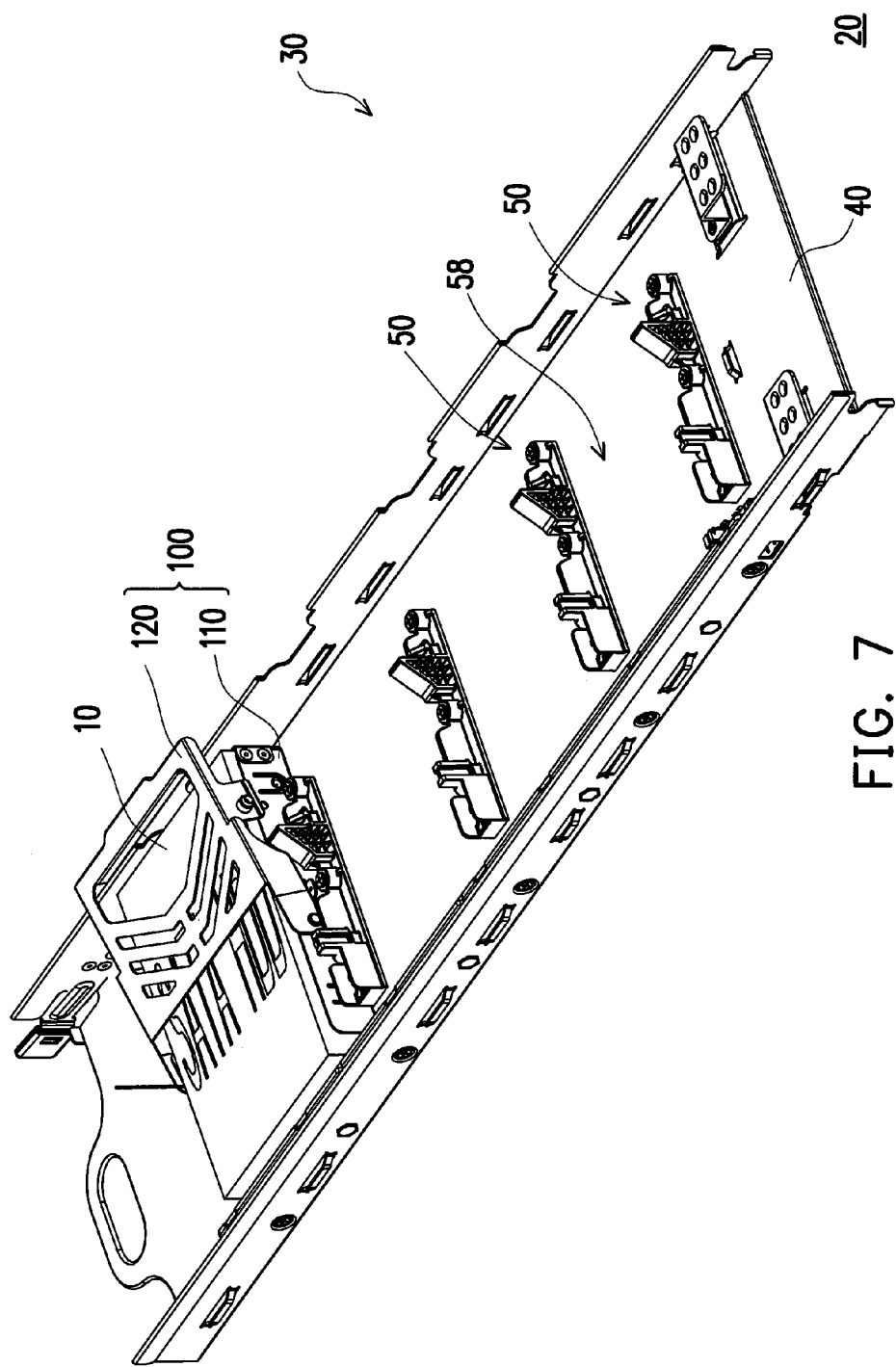
FIG. 7 is a schematic view illustrating that the HDD tray of the HDD rack assembly in FIG. 5 is installed in a HDD rack and the cover has not yet covered the base.
Figure 8:
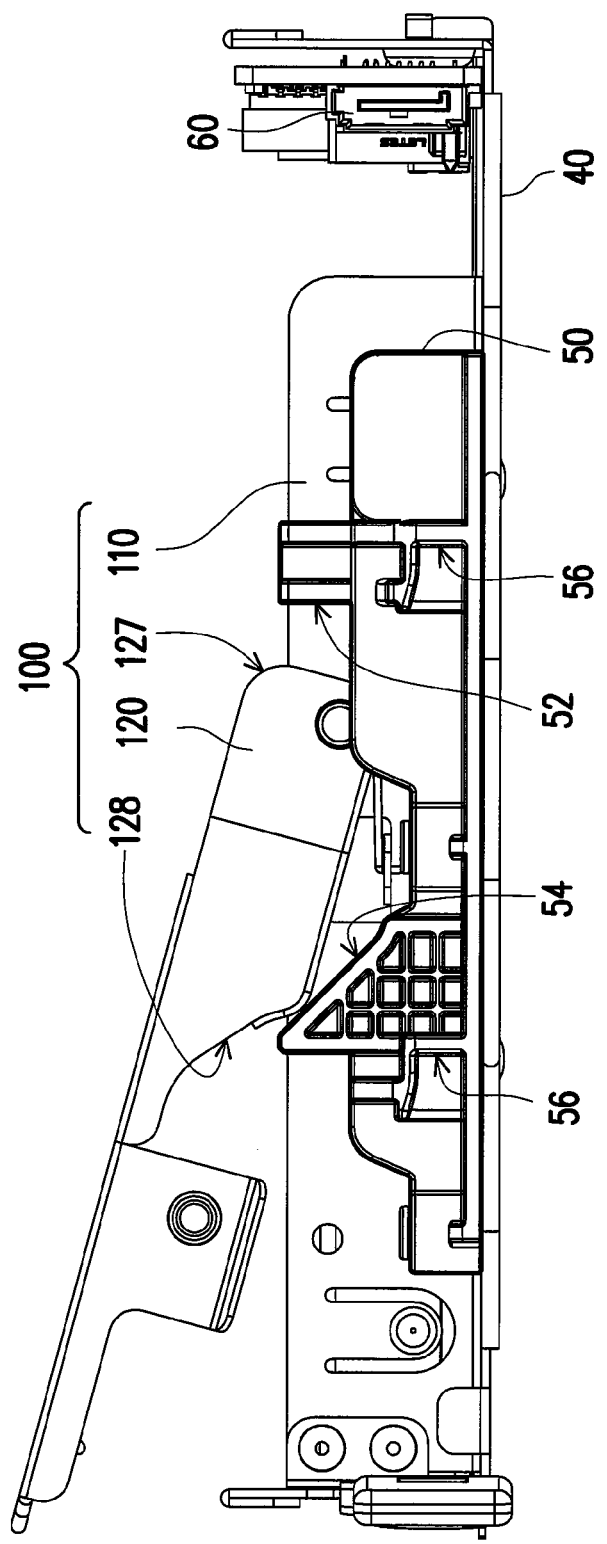
FIG. 8 is a schematic side view illustrating a portion of the HDD rack assembly in FIG. 7.
Figure 9:
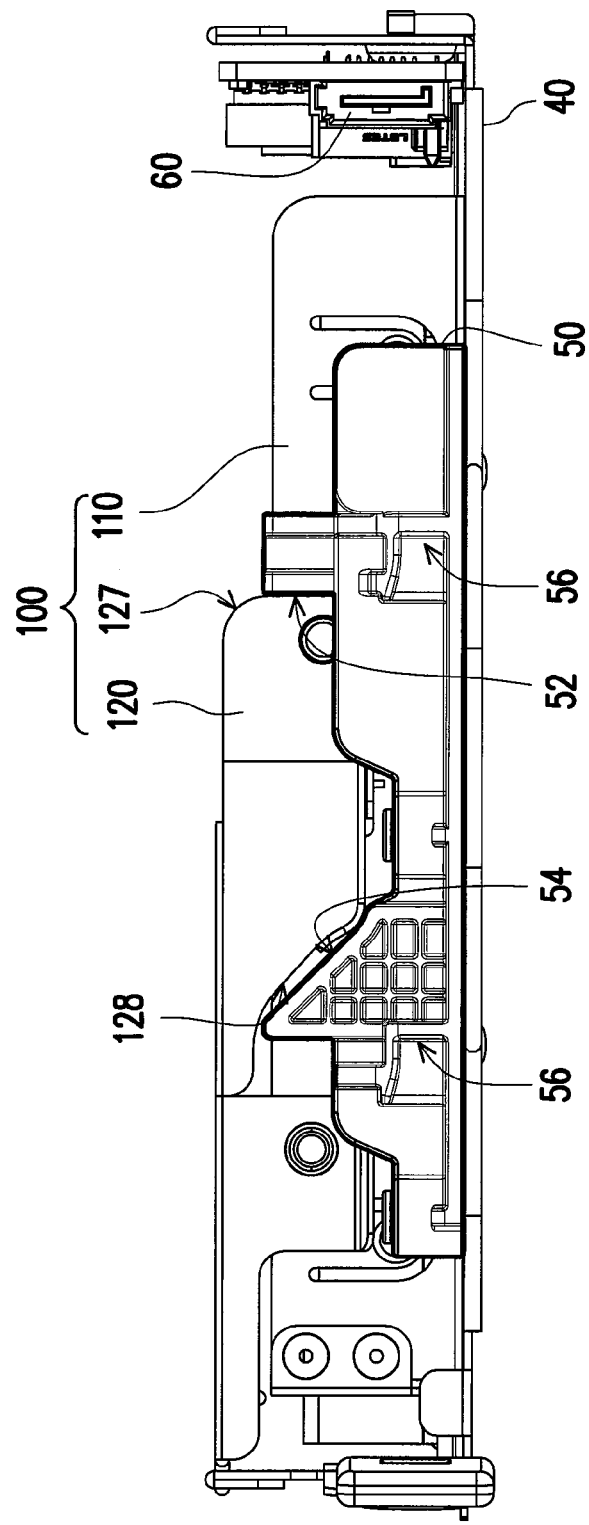
FIG. 9 is a schematic view illustrating that the cover in FIG. 8 covers the base.
Figure 10:
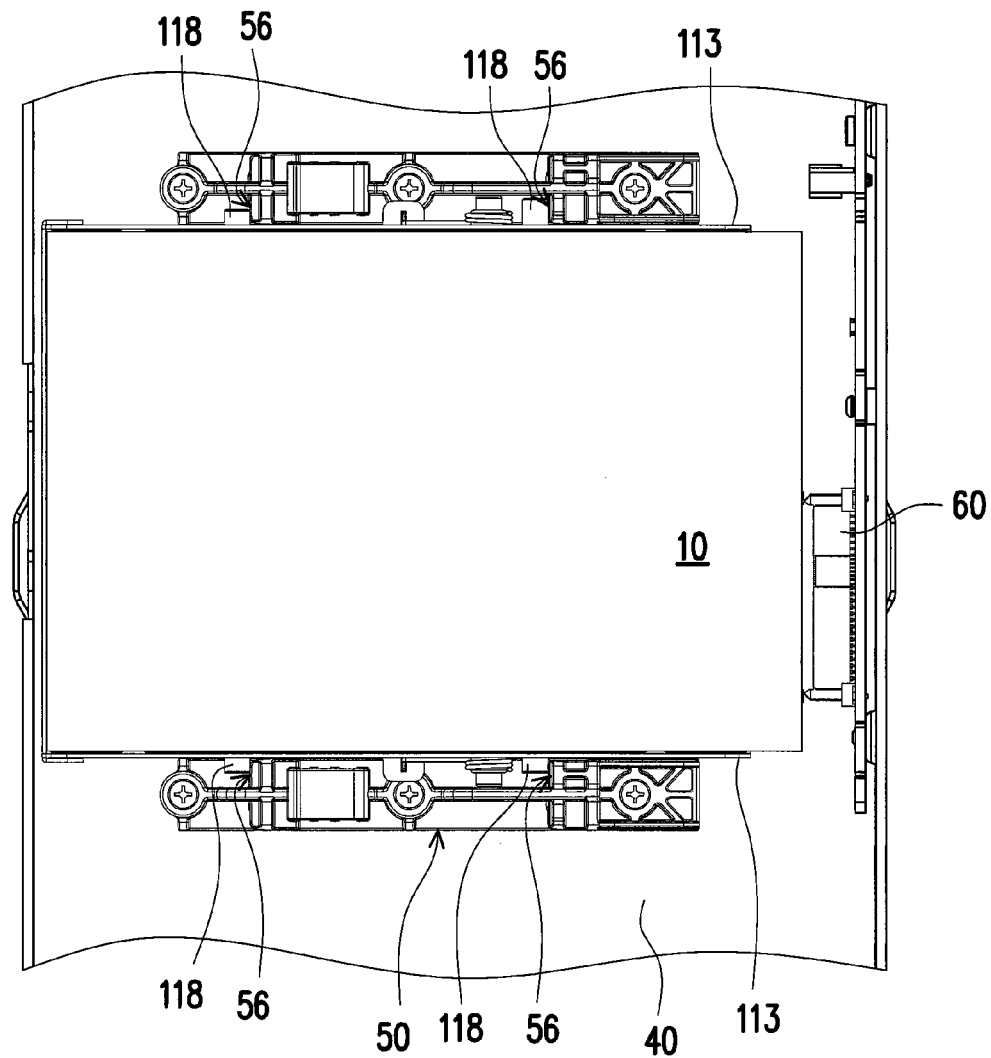
FIG. 10 is a schematic top view illustrating that a HDD is placed into a HDD tray and a cover is hidden.
Figure 11:
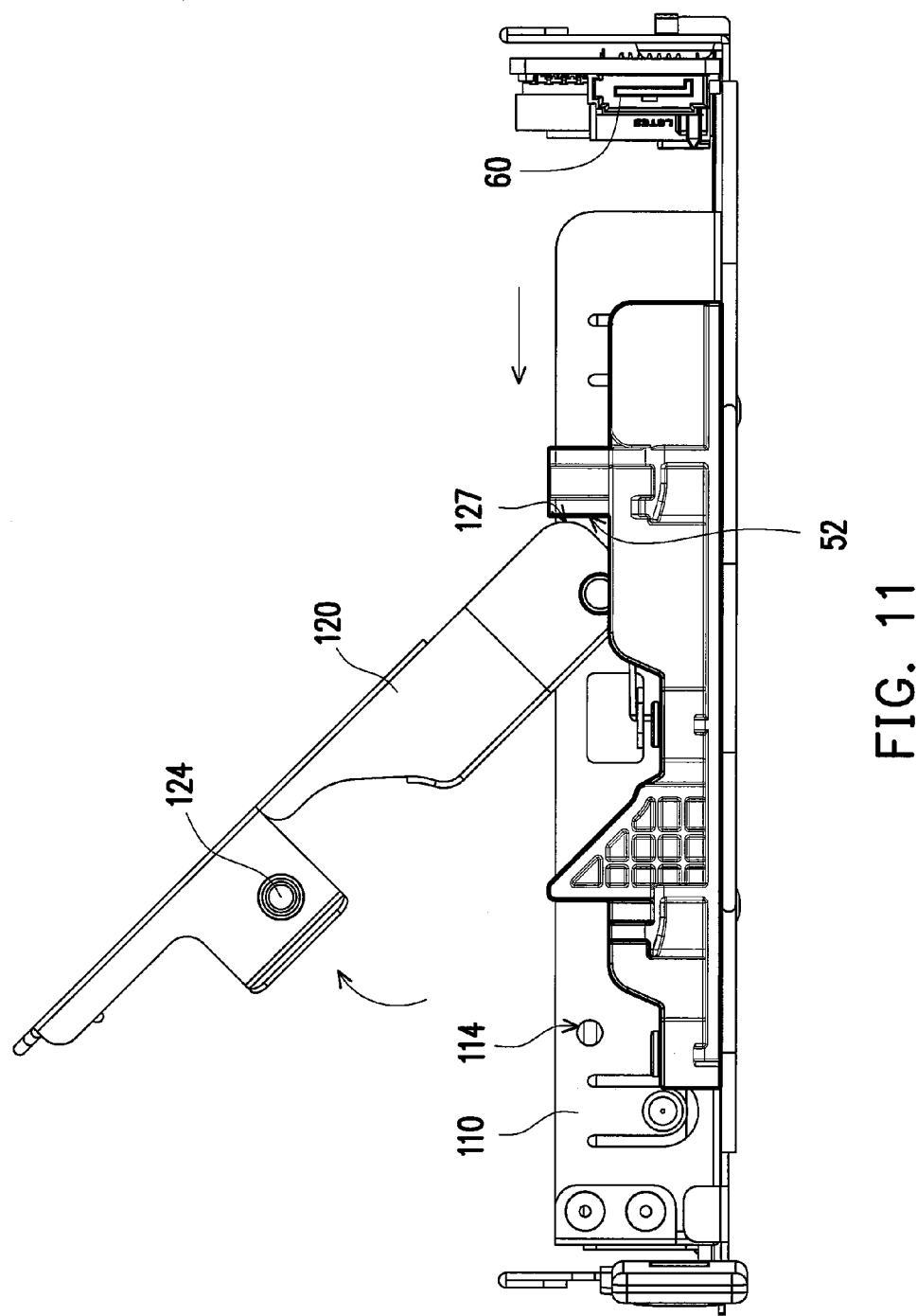
FIG. 11 is a schematic side view illustrating a portion of the HDD tray in FIG. 7 when the HDD tray is retracted from a HDD rack.

FIG. 7 is a schematic view illustrating that the HDD tray of the HDD rack assembly in FIG. 5 is installed in a HDD rack and the cover has not yet covered the base. FIG. 8 is a schematic side view illustrating a portion of the HDD rack assembly in FIG. 7. FIG. 9 is a schematic view illustrating that the cover in FIG. 8 covers the base. FIG. 10 is a schematic top view illustrating that a HDD is placed into a HDD tray and a cover is hidden. FIG. 11 is a schematic side view illustrating a portion of the HDD tray in FIG. 7 when the HDD tray is retracted from a HDD rack.

Referring to FIG. 7 and FIG. 8, when the HDD tray 100 is to be installed to the HDD rack 30, the cover 120 of the HDD tray 100 is first pivoted upward relative to the base 110, and the HDD tray 100 is placed on the track 58 of the HDD rack 30. At this time, the second arcuate edge 128 of the at least one of the cover lateral plates 122 approaches the second stopper 54 of the at least one of the fixing structures 50. Next, when the cover 120 of the HDD tray 100 covers the base 110, the second arcuate edge 128 of the at least one of the cover lateral plates 122 pushes against the second stopper 54 of the at least one of the fixing structures 50 when the cover 120 rotates, such that the base 110 is moved toward the connector 60 to the position shown in FIG. 9. Since the HDD tray 100 of the HDD rack assembly 20 provided herein refers to the HDD tray 100 depicted in FIG. 1, after the cover 120 covers the base 110, the HDD 10 is surrounded by the cover 120 and the base 110 and is fixed by the second fixing members 117 and the third fixing member 112.

It is worth mentioning that when the HDD tray 100 is moved from the position shown in FIG. 8 to the position shown in FIG. 9, the fourth fixing member 118 (referring to FIG. 6) of the at least one of the base lateral plates 113 of the HDD tray 100 slides into the limiting portion 56. Since the limiting portion 56 has the horizontal wall parallel to the rack body 40 and the vertical wall perpendicular to the rack body 40, the fourth fixing member 118 is restricted by the horizontal wall of the limiting portion 56 and cannot be moved away from the rack 40 (the upper side of the drawing). The fourth fixing member 118 is also restricted by the vertical wall of the limiting portion 56 and cannot be moved continuously toward the connector 60 (the right side of the drawing). Besides, FIG. 10 is a schematic view illustrating that the HDD 10 is placed into the HDD tray 100 and the cover 120 is hidden. In FIG. 10, it can be seen that the connector 60 is connected to the HDD 10 when the HDD tray 100 is installed in the HDD rack 30; hence, after the cover 120 of the HDD tray 100 covers the base 110, the HDD tray 100 together with the HDD 10 may be fixed onto the HDD rack 30.

If it is intended to remove the HDD tray 100 from the HDD rack 30, as shown in FIG. 11, when the cover 120 of the HDD tray 100 is pivoted upward relative to the base 110, the first arcuate edge 127 of the at least one of the cover lateral plates 122 pushes against the first stopper 52 of the at least one of the fixing structures 50 when the cover 120 rotates, such that the base 110 is moved away from the connector 60 (the left side of the drawing). Thereby, the HDD 10 (shown in FIG. 10) may be directly detached from the connector 60. Afterwards, the user only has to lift up the cover 120 directly to remove the HDD tray 100 from the HDD rack 30. Therefore, in the HDD rack assembly 20 provided in the embodiment, the HDD tray 100 may be fixed onto the HDD rack 30 without being locked by screws, and the HDD tray 100 may be installed and detached easily and conveniently.

In view of the foregoing, in the HDD tray of the HDD rack assembly provided in the embodiments of the invention, the cover is pivoted to the base. When the cover covers the base, the first fixing members of the cover lateral plates or the base lateral plates extend into the fixing holes of the corresponding base lateral plates or the cover lateral plates to fix the relative location of the cover and the base, such that the HDD is surrounded in the HDD tray. When the cover is pivoted upward relative to the base, each of the first fixing members is drawn back along the inner wall of the fixing hole, so as to easily exit the corresponding fixing hole. In addition, in the HDD rack of the HDD rack assembly, the fixing structure is disposed in the rack body to form the track where the HDD tray is slidably disposed. When the HDD tray is located on the track of the HDD rack, and the cover is pivoted downward relative to the base, the second arcuate edge of the at least one of the cover lateral plates pushes against the second stopper of the at least one of the fixing structures when the cover rotates, such that the base is moved toward the connector. When the HDD tray is located on the track of the HDD rack and the base is pivoted upward relative to the base, the first arcuate edge of the at least one of the cover lateral plates pushes against the first stopper of the at least one of the fixing structures when the cover rotates, such that the base is moved away from the connector, and that the HDD located in the HDD tray is detached directly from the connector on the HDD rack.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A hard disk drive (HDD) tray, adapted to carry a HDD and comprising:
   a base, comprising a bottom plate and two base lateral plates connected to the bottom plate; and
   a cover, pivoted to the base and comprising a top plate and two cover lateral plates connected to the top plate, wherein one of each of the cover lateral plates and a corresponding base lateral plate of the base lateral plates comprises a first fixing member which is retractable, the other one comprises a fixing hole corresponding to the first fixing member, each of the first fixing members comprises an outer shell with a concave hole, an elastic member located in the concave hole, a bead connected to the elastic member, and a portion of the bead normally protrudes from the concave hole and is adapted to be retracted into the concave hole when compressed,
   the HDD is adapted to be located between the base and the cover, when the cover covers the base, the first fixing members extend into the corresponding fixing holes, so as to fix a relative location of the cover and the base, and
   when the cover is pivoted upward relative to the base, each of the first fixing members is drawn back along an inner wall of the fixing hole, so as to exit the corresponding fixing hole.

2. The HDD tray as claimed in claim 1, wherein the two base lateral plates respectively comprise a plurality of breaches, the breaches surround and define a plurality of cantilevers, the cantilevers respectively comprise a plurality of second fixing members protruding from two inner surfaces of the two base lateral plates, the HDD comprises a plurality of threaded holes located on two sides, and when the HDD is located in the HDD tray, the second fixing members are adapted to extend into the threaded holes of the HDD.

3. The HDD tray as claimed in claim 1, wherein the bottom plate of the base comprises a third fixing member, the HDD comprises a threaded hole located at a bottom surface, and when the HDD is located in the HDD tray, the third fixing member is adapted to extend into the threaded hole of the HDD.

4. A HDD rack assembly, adapted to carry a HDD and comprising:
   a HDD rack, comprising:
   a rack body;
   a plurality of fixing structures, disposed on the rack body to form a track, at least one of the fixing structures comprising a first stopper; and
   a connector, disposed on the rack body and located at an end of the track; and a HDD tray, detachably disposed on the fixing structures along the tracks and comprising a base, comprising a bottom plate and two base lateral plates connected to the bottom plate; and a cover, pivoted to the base and comprising a top plate and two cover lateral plates connected to the top plate, wherein at least one of the cover lateral plates comprises a first arcuate edge corresponding to the first stopper, one of each of the cover lateral plates and a corresponding base lateral plate of the base lateral plates comprises a first fixing member which is retractable, the other one comprises a fixing hole corresponding to the first fixing member, each of the first fixing members comprises an outer shell with a concave hole, an elastic member located in the concave hole, a bead connected to the elastic member, and a portion of the bead normally protrudes from the concave hole and is adapted to be retracted into the concave hole when compressed, the HDD is adapted to be located between the base and the cover, when the HDD tray is located on the track of the HDD rack, and the cover covers the base, the first arcuate edge of the at least one of the cover lateral plates is located next to the first stopper of the at least one of the fixing structures, the first fixing members extend into the corresponding fixing holes to fix a relative location of the cover and the base, when the HDD is located on the track of the HDD rack, and the cover is pivoted upward relative to the base, the first arcuate edge of the at least one of the cover lateral plates pushes against the first stopper of the at least one of the fixing structures when the cover rotates, such that the base is moved away from the connector, and each of the first fixing members is drawn back along an inner wall of the fixing hole, so as to exit the corresponding fixing hole.

5. The HDD rack assembly as claimed in claim 4, wherein at least one of the fixing structures comprises a second stopper, at least one of the cover lateral plates comprises a second arcuate edge corresponding to the second stopper, and when the cover covers the base, the second arcuate edge of the at least one of the cover lateral plates pushes against the second stopper of the at least one of the fixing structures when the cover rotates, such that the base is moved toward the connector.

6. The HDD rack assembly as claimed in claim 4, wherein the two base lateral plates respectively comprises a plurality of breaches, the breaches surround and define a plurality of cantilevers, the cantilevers respectively comprise a plurality of second fixing members protruding from two inner surfaces of the two base lateral plates, the HDD comprises a plurality of threaded holes located on two sides, and when the HDD is located in the HDD tray, the second fixing members are adapted to extend into the threaded holes of the HDD.

7. The HDD assembly as claimed in claim 4, wherein the bottom plate of the base comprises a third fixing member, the HDD comprises a threaded hole located at a bottom surface, and when the HDD is located in the HDD tray, the third fixing member is adapted to extend into the threaded hole of the HDD.

8. The HDD rack assembly as claimed in claim 4, wherein at least one of the base lateral plates comprises a fourth fixing member protruding from an outer surface, and at least one of the fixing structures comprises a limiting portion corresponding to the fourth fixing member to restrict a location of the HDD tray relative to the HDD rack.

* * * * *